(12) United States Patent
Kobal et al.

(10) Patent No.: US 8,121,838 B2
(45) Date of Patent: Feb. 21, 2012

(54) METHOD AND SYSTEM FOR AUTOMATIC TRANSCRIPTION PRIORITIZATION

(75) Inventors: Jeffrey S. Kobal, Lake Worth, FL (US); Girish Dhanakshirur, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 654 days.

(21) Appl. No.: 11/401,792

(22) Filed: Apr. 11, 2006

(65) Prior Publication Data

US 2007/0239445 A1    Oct. 11, 2007

(51) Int. Cl.
*G10L 15/26* (2006.01)
(52) U.S. Cl. .......................... 704/235; 704/251; 704/231
(58) Field of Classification Search .................. 704/235, 704/251, 231
See application file for complete search history.

(56) References Cited

U.S. PATENT DOCUMENTS

| | | | |
|---|---|---|---|
| 5,625,749 A | 4/1997 | Goldenthal et al. | |
| 5,864,805 A * | 1/1999 | Chen et al. | 704/235 |
| 5,983,177 A | 11/1999 | Wu et al. | |
| 6,006,183 A * | 12/1999 | Lai et al. | 704/235 |
| 6,122,614 A * | 9/2000 | Kahn et al. | 704/235 |
| 6,208,964 B1 | 3/2001 | Sabourin | |
| 6,327,566 B1* | 12/2001 | Vanbuskirk et al. | 704/257 |
| 6,356,971 B1* | 3/2002 | Katz et al. | 710/301 |
| 6,754,625 B2* | 6/2004 | Olsen et al. | 704/235 |
| 6,850,609 B1* | 2/2005 | Schrage | 379/202.01 |
| 6,928,407 B2 | 8/2005 | Ponceleon et al. | |
| 6,963,834 B2* | 11/2005 | Hartley et al. | 704/235 |
| 6,993,482 B2* | 1/2006 | Ahlenius | 704/235 |
| 7,260,534 B2* | 8/2007 | Gandhi et al. | 704/270 |
| 2003/0061054 A1* | 3/2003 | Payne et al. | 704/277 |

OTHER PUBLICATIONS

Michael F. McTear, Spoken Dialogue Technology: Enabling the Conversational User Interface, ACM Computing Surveys, 34(1), pp. 90-169, Mar. 2002.
Douglas W. Oard et al., Building an Information Retrieval Test Collection for Spontaneous Conversational Speech, SIGIR '04, Jul. 25-29, 2004, Sheffield, South Yorkshire, UK.
Konstantinos Koumpis et al., Automatic Summarization of Voicemail Messages Using Lexical and Prosodic Features, ACM Transactions on Speech and Language Processing, 2(1), pp. 1-24, Feb. 2005.

\* cited by examiner

*Primary Examiner* — Talivaldis Ivars Smits
*Assistant Examiner* — Shaun Roberts
(74) *Attorney, Agent, or Firm* — Wolf, Greenfield & Sacks, P.C.

(57) ABSTRACT

A visual toolkit for prioritizing speech transcription from a plurality of speech recognition tasks is provided. The toolkit can include a logger (102) for capturing information from a speech recognition system, a processor (104) for determining an accuracy rating based at least in part on information that is independent of a confidence score associated with a recognized phrase and independent of confidence scores associated with a plurality of phrases in an N-best match, and a visual display (106) for categorizing the information and prioritizing a transcription of the information based on the accuracy rating. The prioritizing identifies spoken utterances having a transcription priority in view of the recognized result. The visual display can include a transcription category (156) having a modifiable textbox entry with a text entry initially corresponding to a text of the recognized result, and an accept button (157) for validating a transcription of the recognized result. The categories can be automatically ranked by the accuracy rating in an ordered priority for increasing an efficiency of transcription.

28 Claims, 4 Drawing Sheets

METHOD AND SYSTEM FOR AUTOMATIC TRANSCRIPTION PRIORITIZATION

BACKGROUND

1. Field of the Invention

The invention relates to the field of speech processing and, more particularly, to speech recognition systems.

2. Description of the Related Art

A speech recognition system can recognize speech and render a text corresponding to the recognized speech. In general, a speech recognition system can identify features in a spoken utterance, and based on the identified features, distinguish the utterance from other words or phrases of a defined vocabulary. The speech recognition system can identify words, phonemes, morphemes, or other sub-word units of speech by evaluating the identified features during a speech recognition task. These units of speech can be associated with a text or a phonetic string that corresponds to the spoken utterance.

Speech recognition systems and natural language understanding systems can also include grammars. The grammars can define the rules of interaction among the units of speech during the recognition of a word or phrase. For a particular vocalization, or utterance, processed by such a system, the utterance may contain a word or phrase that matches one in an active grammar set, and that the system correctly recognizes as a match, thereby yielding a correct acceptance decision by the system. The utterance also may contain a word or phrase that does not have a match in the active grammar, and that the system correctly rejects, yielding a correct rejection decision by the system.

However, speech recognition systems can yield recognition errors. Certain words and phrases may be confused for similarly sounding words or phrases based on the grammars or features. One type of error relating to an active grammar set is the false acceptance of a word or phrase that is incorrectly interpreted as matching one in an active set. Another type of error is a false rejection, which occurs when a word or phrase that has a match in the active set is not recognized. Still another type of error can occur when a word or phrase of an utterance has a match in the active set, but is incorrectly interpreted as matching a different word or phrase, this type of error typically being characterized as a "false acceptance—grammar." The speech recognition system may not be aware of such errors. However, the system can learn from the errors if the system is made aware of the errors.

Manual transcription is a process of having a person transcribe an audio recording of a spoken utterance to textual form. With regard to speech recognition systems that convert spoken utterances to a text, a manual transcription of the spoken utterance can be referenced for identifying text errors in the speech recognition results. For example, the person can compare the manual transcription of the spoken utterance to the text produced by the speech recognition system. Results can be validated by identifying those utterances that were incorrectly recognized. Understandably, the validation does not require a direct comparison of the manual transcription against the text results from the speech recognition system. The recognition results need not be used as a guide or starting point for the person performing the transcribing. The person performing the transcription can simply write down the text he or she hears being spoken in the utterance.

In one aspect, incorrectly recognized utterances can be used for retraining the speech recognition system. The validation process can also reveal which grammars need to be re-tuned or updated. In practice, a person listens to a spoken utterance and determines whether the recognition result is correct. For example, the spoken utterance can be presented in an audible format and the recognition result can be presented as corresponding text. The person can determine whether the text correctly corresponds to the audible spoken utterance. If a recognition result is incorrect, the user can manually update the recognition result with the correct transcription. In general, the user edits the text to correct mistakes during transcription.

Manual transcription, however, is typically a tedious process that requires human input to validate and manually correct recognition results. In addition, speech recognition systems may process hundreds or even thousands of utterances creating enormous amounts of data. The user may not be aware which utterances were interpreted less correctly than other utterances, and/or which utterances should be used to update a training or tuning of the speech recognition system. A need therefore exists for improving the efficiency by which manual transcription validates recognition results so that the performance of a speech recognition system can be enhanced.

SUMMARY OF THE INVENTION

The present invention provides a method and system for prioritizing speech transcription in validating a speech recognition performance. The prioritizing identifies spoken utterances having a transcription priority in view of a recognition result. The method can include logging information generated from a recognition task of one or more spoken utterances, categorizing the information, and prioritizing a transcription of the information based on a category. The recognition task can associate a spoken utterance with at least one recognized result. The information categorized can include at least one of a spoken utterance, a recognized result, a confidence score, and an N-best match. A transcription category can be presented which initially defaults to a text representation of the recognition result. The categories can be ranked according to an accuracy rating for identifying a priority of transcription.

One aspect of the present invention is a visual toolkit for prioritizing speech transcription. The toolkit can include a logger for capturing information from a speech recognition system during a processing of one or more spoken utterances, a processor for determining an accuracy rating of the information, and a visual display for categorizing the information and prioritizing a transcription of the information based on the accuracy rating. The prioritizing identifies spoken utterances having a transcription priority in view of the recognized result. The visual display can present a spoken utterance category having a play button for audibly presenting the spoken utterance, a recognized result category having a textbox entry for presenting the recognized result, a confidence score category identifying a numeric ranking of the recognized result, and a N-best match category having a pop-up box for presenting a textbox of neighbor recognition results. The visual display can include a transcription category having a modifiable textbox entry with a text entry initially corresponding to a text of the recognized result, and an accept button for validating a transcription of the recognized result. The categories can be automatically ranked by the accuracy rating in an ordered priority for transcription.

Another aspect of the present invention is a method for prioritizing speech transcription for validating speech recognition performance. The method can include importing log information from a speech recognition system from a recognition task of one or more spoken utterances, and automatically filling a transcription category with a text representation of the recognized result. The method can also include determining an accuracy rating for determining a transcription priority. The accuracy rating, more particularly, can provide a weighting of a confidence score by confidence measures of closest matching neighbor recognition results. The information in the display can be automatically categorized in view of the accuracy rating, wherein the prioritizing identifies spoken utterances having a transcription priority.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
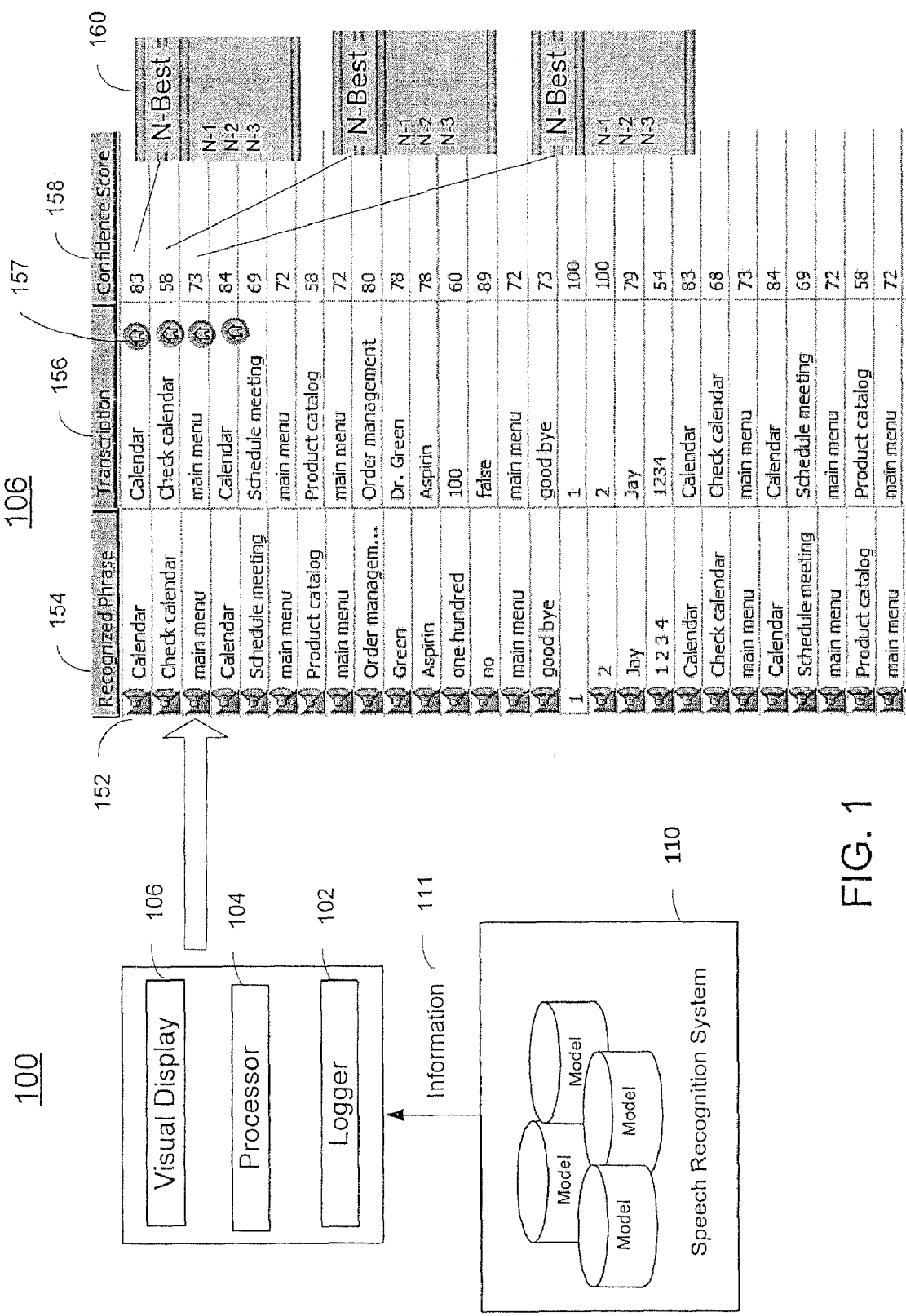
FIG. 1 is schematic diagram of a visual toolkit for prioritizing a speech transcription, according to one embodiment of the invention.

FIG. 1 is a schematic diagram of a visual toolkit 100 for prioritizing a speech transcription for validating speech recognition performance, according to one embodiment of the invention. The visual toolkit 100 illustratively includes a logger 102, a processor 104, and a visual display 106 that are communicatively linked to one another and that cooperatively perform various tasks pertaining to the prioritization of the speech transcription for validating speech recognition performance.

Operatively, the logger 102 captures from a speech recognition system 110 information 111 generated during processing of one or more spoken utterances by the system based on at least one model 112a-d. The processor 104 determines an accuracy rating of the information 112, and with the information, the visual display 106 categorizes the spoken utterances into categories.

The visual display 106 can also prioritize a transcription of the information 111 based on a category. In practice, the speech recognition system 110 associates a spoken utterance with at least one recognized result. The spoken utterance can be an acoustic waveform, a digitally recorded waveform, or any other media capable of representing a spoken utterance. The recognized result can be an output of the speech recognition system 110 and can comprise a text representation of the identified spoken utterance. For example, the speech recognition system 110 can output the recognized result in text such as a string of characters, letters, or words. The text may or may not be a correct interpretation of the spoken utterance.

The logger 102 can receive the information 111 generated from the processing of a spoken utterance. The visual toolkit 100 and the speech recognition system 110 may or may not be on the same platform. In one arrangement, the speech recognition system 110 can be remote from the visual toolkit 100, such as a remote web server. The visual toolkit 100 can receive the information 111 over a communication channel such as the ethernet or any other wired or wireless data channel. Embodiments of the invention are herein primarily concerned with the processing and the presentation of the information, and not necessarily the means by which the information is communicated. The information 111 can include the spoken utterance, the recognized result, a confidence score, an N-best (neighbor) match and any other processing results generated during the processing of the spoken utterance.

The confidence score can be a degree of confidence the speech recognition system 110 associates with the recognition of a spoken utterance. The speech recognition system 110 can include internal metrics which assign numeric values during the process of recognition. In one particular example, the speech recognition system 110 can include Hidden Markov Models (HMMs) for identifying phonemes of speech. Each HMM can associate a feature vector of speech with a phoneme to produce a maximum likelihood score. In another example, the speech recognition system 110 can include a neural network (NN) having a processing layer of computation nodes, or artificial neurons, for recognizing patterns in speech. The NN can generate statistical probabilities, or scores, for quantifying the likelihood of a recognized match. Scores can be based on a distance metric describing the closeness of the feature vector to the parameters of the phoneme represented by the HMM of the NN. In general, the confidence score describes the confidence that the speech recognition system 110 associates with the recognized result. The confidence score can be a number or a percentile.

An N-best (Neighbor) match is the closest set of recognized results following the recognized result. For example the speech recognition system 110 can identify a plurality of neighbor candidates during the recognition process of which each candidate will have an associated confidence score. Understandably, the speech recognition system 110 generally selects the recognition result having the highest confidence scores. The remaining candidates can be ranked by confidence score to produce an N-best match; that is, the list of length N having the next closest match to the spoken utterance.

The processor 102 can produce an accuracy rating from the information 111. The accuracy rating can be an update to the confidence score based on the N-best matches. For example, a high confidence score can be initially interpreted as a high accuracy result; that is, that the text output by the speech recognition system 110 is a good match for the spoken utterance. However, if the N-best matches also have similarly high confidence scores, the confidence score can be considered less accurate. Understandably, a high accuracy rating is generally associated with a text output having a high confidence score relative to all other output matches. Notably, the processor 102 compares the confidence score of the output text to the N-best matches and determines a distance metric for each candidate. The processor 102 assigns an accuracy rating based on the confidence score in view of the distance metrics. The processor 102 decreases the accuracy rating of a text output if the distance metrics of the N-best matches are sufficiently large or approximate the confidence score of the text output.

The visual display 106 presents the information 111 in a visible format. For example, the visual display can be a computer screen, and the information 111 can be presented through a software-implemented graphical user interface (GUI). The visual display 106 can parse and categorize the information 111 in an arranged format. This can include a spoken utterance category 152 having a play button for audibly presenting the spoken utterance, a recognized result category 154 having a textbox entry for presenting the recognized result, a confidence score category 158 identifying a numeric ranking of the recognized result, and a N-best match category 160 having a pop-up box for presenting a textbox of neighbor recognition results. Notably, a recognition result is a text representation of the recognized spoken utterance that may be one of a correct or incorrect interpretation of the spoken utterance.

The visual toolkit 100 can also include a transcription category 156 having a modifiable textbox entry with a text entry that initially corresponds to a text of the recognized result. An accept button 157 can be associated with the information of a processed spoken utterance for validating a transcription of the recognized result.

In one aspect, the categories can be automatically ranked by the accuracy rating in an ordered priority for transcription. For example, the visual toolkit 100 can present the information 111 based on the accuracy rating determined by the processor 102. Those recognition results having the highest recognition score can be placed at the bottom of the list in the visual display 106. And, the recognition results having the lowest recognition score can be placed at the top of the list in the visual display. Understandably, a user in charge of validating transcriptions can start with the poorly recognized results in order to update the speech recognition system 110 with the errors of the lowest recognition spoken utterances. As described, the speech recognition system 110 can be tuned or updated to improve a recognition performance. The tuning and updating generally require presenting examples which failed, their incorrect interpretation being given by the recognition results, and the correct interpretation being the transcription. Accordingly, a user can transcribe those recognition results having the lowest accuracy rating first for initially updating and tuning the speech recognition system 110. In practice, skilled transcription services can be costly. A benefit of the prioritization can reduce costs by classifying results into skilled and non-skilled categories. The least accurate results can be sent to a skilled transcriber for in-depth analysis, and the most accurate results can be sent to a non-skilled transcriber. The non-skilled personnel can validate the recognition results of the automatic speech recognition system while skipping the recognition results that are incorrect Embodiments of the invention primarily concern an automated method and system for automatically filling transcriptions in a speech application. Accordingly, the visual toolkit 100 can automatically fill the transcription columns 156 with the text of the recognized phrase 154 so as to expedite the manual validation process. In another aspect, the visual display 106 can automatically fill in the transcriptions starting at the top of the ordered list and working downwards into the list. Each line in the visual display 106 can also be controlled, for example, by positioning a cursor and "clicking on" in order to auto-complete the filling of an N-best results pop-up list.

The user performing the validation listens to the spoken utterance 152, determines if the recognized phrase 154 is correct, and modifies the text of the transcription 156 in order to correct errors. The automatic filling of the transcription category 156 with the recognized phrase 154 can save the user time in manually transcribing the correct interpretation of the recognized text. The accept button 157 can also reduce the amount of time required for transcription in view of the automated filling process. For example, a correctly transcribed phrase need not be modified or edited. Accordingly, the user can accept the transcription by hitting the accept button 157, versus manually typing in a carriage return within the textbox of the transcription 156. The visual toolkit 100 can also detect a "click" action to automatically fill transcriptions.

In one arrangement, to further improve transcription efficiency, the ordered priority is identified by a color code associated with the transcription priority. The prioritizing identifies spoken utterances having a transcription priority in view of the accuracy rating. For example, the visual display 106 can display a green accept button for validated transcriptions, and a red button for invalidated transcription. A validated transcription is one in which the recognized phrase 154 is a correct interpretation of the spoken utterance 152. Accordingly, the transcription is valid as it has been already automatically filled with the text of the recognition result. An invalidated transcription is one in which the recognized phrase 154 is an incorrect interpretation of the spoken utterance 152. Accordingly, the user is required to modify the text of the transcription 156 such that it matches the text representation of the spoken utterance. Notably, the invalidated transcriptions can be prioritized, or ranked, according to the accuracy rating. In one arrangement, color codes can be assigned on the accuracy rating. For example, a spectrum of colors can be assigned to the range of accuracy ratings which may include, for example, the colors yellow, orange, blue, and green. These are only exemplary, and it is to be understood that the invention is not limited to these.

Figure 2:
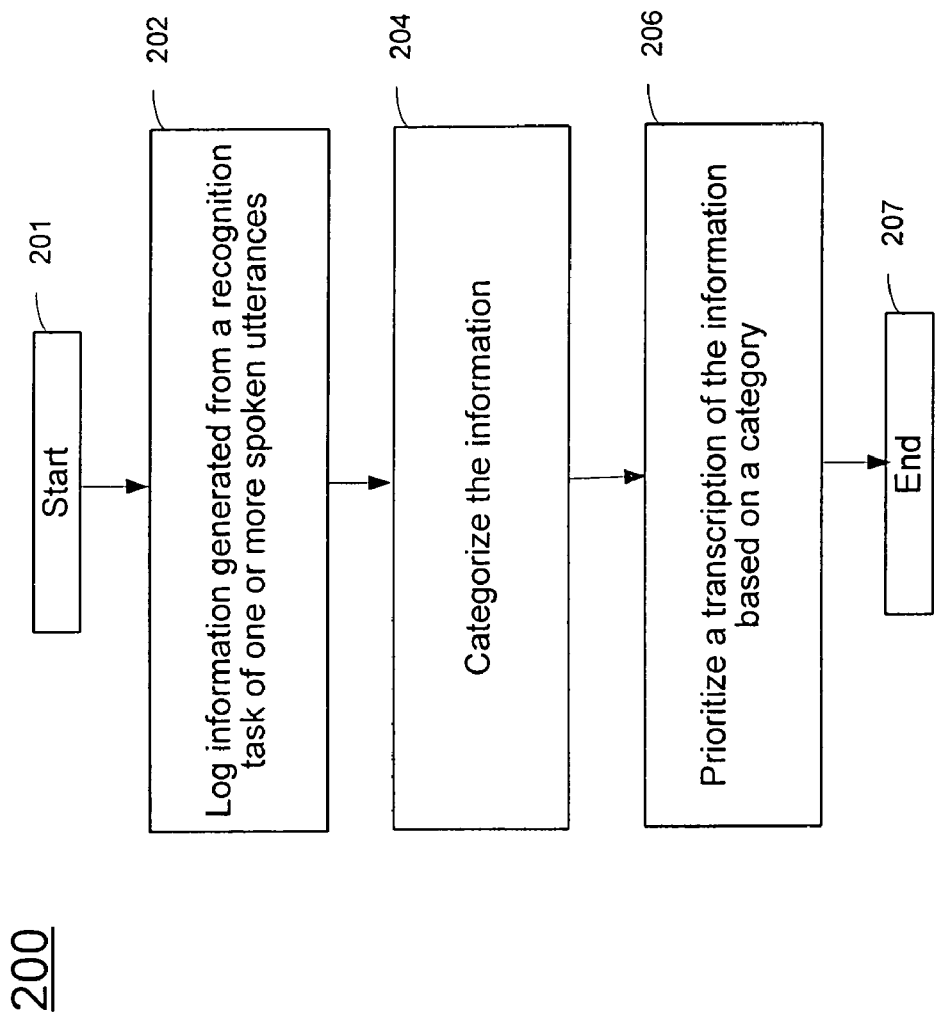
FIG. 2 is a flowchart of exemplary steps of a method for prioritizing a speech transcription, according to another embodiment of the invention.

Referring to FIG. 2, the exemplary steps of a method 200 for prioritizing speech transcription for validating speech recognition performance, according to another embodiment of invention, are shown. When describing the method 200, reference will be made to FIG. 1, although it is explicitly noted that the method 200 can be practiced in any other suitable system or device. Moreover, the steps of the method 200 are not limited to the particular order in which they are presented in FIG. 2. The inventive method can also have a greater number of steps or a fewer number of steps than those shown in FIG. 2.

At step 201 the method can begin. At step 202, information generated from a recognition task of one or more spoken utterances can be logged. The information includes at least one of a spoken utterance, a recognized result, a confidence score, and an N-best match. For example, referring to FIG. 1, the speech recognition system 110 performs the speech recognition task or tasks that produce the information during a processing of a spoken utterance. A spoken utterance can be submitted to the speech recognition system 110 which generates a text output. The text output may or may not be a correct interpretation of the spoken utterance.

At step 204, the information can be categorized. For example, referring to FIG. 1, categories can be determined from the information 111, which include a spoken utterance category 152, a recognized result category 154, a confidence score category 158, and a N-best match category 160. A transcription category 156 can also be included in the visual display 160. The transcription can be presented as a modifiable text, wherein the transcription initially defaults to a text representation of the recognition result. Understandably, the transcription may be one of a correct or incorrect interpretation of the spoken utterance. The categories can be presented in the visual display 106.

At step 206, a transcription of the information can be prioritized based on a category. Notably, the prioritizing identifies spoken utterances having a transcription priority based on recognition results. For example, referring to FIG. 1, the prioritizing is based on a category such as an accuracy rating, wherein the accuracy rating is a weighting of the confidence score by the N-best matches. The accuracy rating (not shown) may also be categorized in the visual display with the confidence score 158. The processor 102 determines the accuracy rating by comparing the confidence scores of the N-best matches with the confidence score of the recognized result. Initially, the accuracy rating is assigned a score corresponding to the confidence score of the recognized result. If the N-best matches have significantly lower confidence scores, then the confidence score of the recognized result is unchanged. If the N-best matches have neighbor confidence scores approximating the confidence score, then the accuracy rating is lowered. The accuracy rating can be scaled on a linear or non-linear scale as a function of the N-best match confidence scores. At step 207, the method illustratively concludes.

Figure 3:
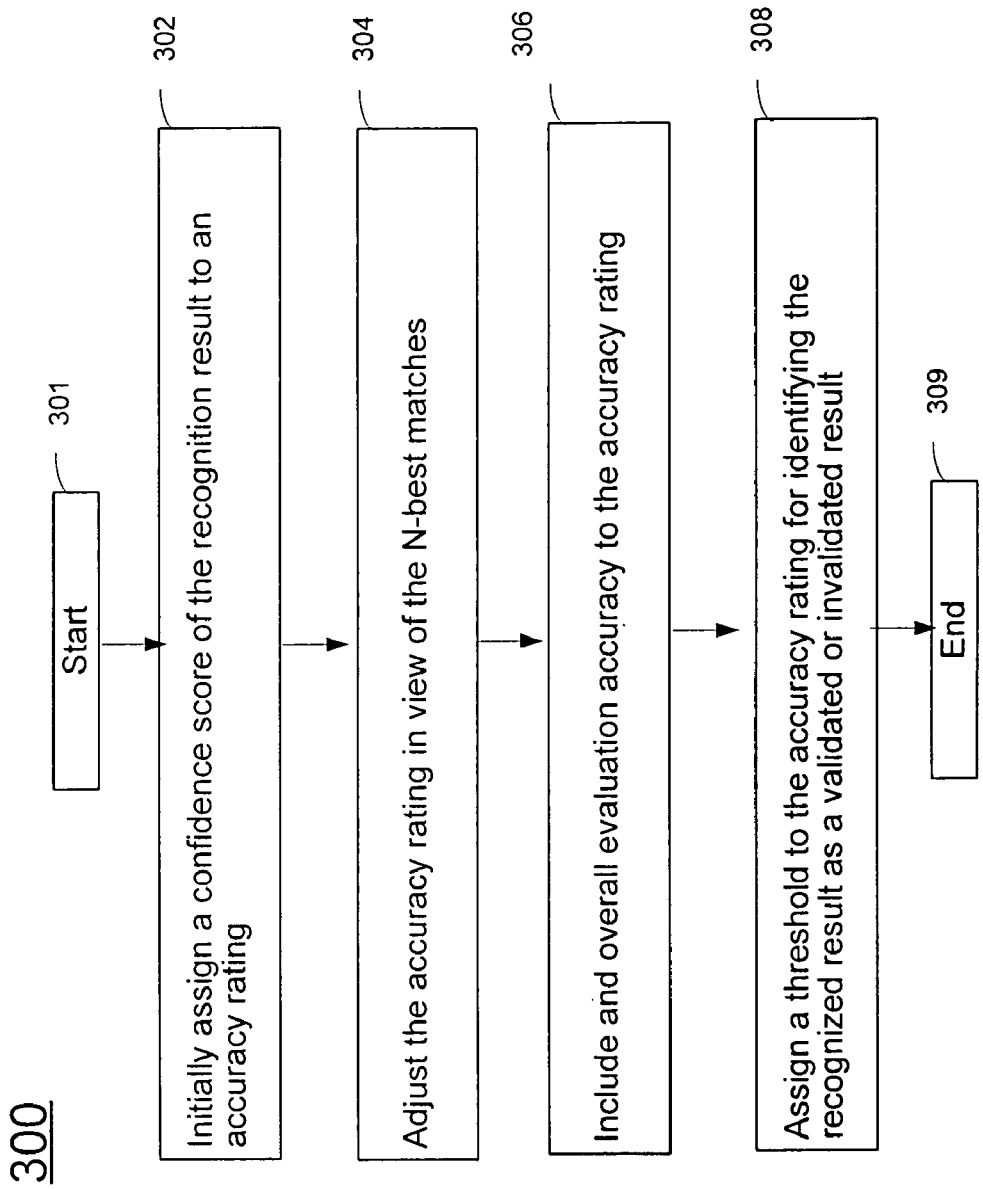
FIG. 3 is a flowchart of exemplary steps of a method for determining an accuracy rating for prioritizing a speech transcription, according to yet another embodiment of the invention.

Referring to FIG. 3, the exemplary steps of a method 300, based on an algorithm 300 for determining the accuracy rating according to still another embodiment, are illustrated. Reference will be made to FIG. 1 for identifying elements of the invention concerned with the method steps. At step 301, the process illustratively begins. At step 302, the accuracy rating can be initially assigned the confidence score of the recognition result. For example, referring to FIG. 1, the processor 102 can extract a confidence score of a processed result which can be obtained from the information 111 associated with a spoken utterance. The processor 102 can create an accuracy rating variable in computer memory and store the confidence score.

At step 304, an accuracy rating can be adjusted in view of the N-best matches. For example, referring to FIG. 1, the processor 102 can calculate a numeric distance between each neighbor candidate confidence score and the recognition result confidence score. The processor 102 can generate a list of numeric distances and order the N-best list based on the distances. In one arrangement, the processor can weight the distances, such as by averaging the N-best distance measures, or by applying non-linear weights to the N-best distance scores. For example, the acoustic confusability, the duration of the utterance, an intelligibility metric, or a quality measure of the speech features can be used to weight the N-best distances. The weighting produces a total N-best distance measure that can be compared to the confidence score of the recognized results. The processor 102 can determine a scaling from the total N-best distance measure relative to the confidence score. For example, a mapping can associate the N-best distance measure with a scaling factor. Understandably, the scaling factor is applied to the accuracy rating to adjust the accuracy rating in accordance with the N-best distance measure.

At step 306, an overall evaluation accuracy can be included with the accuracy rating. The overall evaluation accuracy can be included through an addition operation or a multiplication operation such as a scaling. In one aspect, a phonetic analysis of the N-best results can be conducted to determine a suitable scaling factor. For example, utterances having more phonemes generally require more recognition grammars which can increase the likelihood of errors. Also, an acoustic confusability can be determined to assign scaling weights based on a confusability metric. Utterances having greater acoustic complexity can be given greater weight. In addition, a correlation difference with other spoken utterances producing the same recognized result can be included. For instance, similar sounding utterances may be mistakenly interpreted as another utterance on a consistent basis. Understandably, identifying those utterances producing similar incorrect recognition results can be given a higher weighting. The higher weighting can prompt the speech recognition system to further evaluate those incorrectly processed utterances for tuning and updating the recognition system.

At step 308, a threshold can be assigned to the accuracy rating for identifying the recognized result as a validated or invalidated result. For example an accuracy rating above a threshold identifies validated results, and an accuracy rating below a threshold identifies invalidated results. An accept criteria can be assigned to validated results, and a reject criteria can be assigned to invalidated results. At step 309 the algorithm can end.

Figure 4:
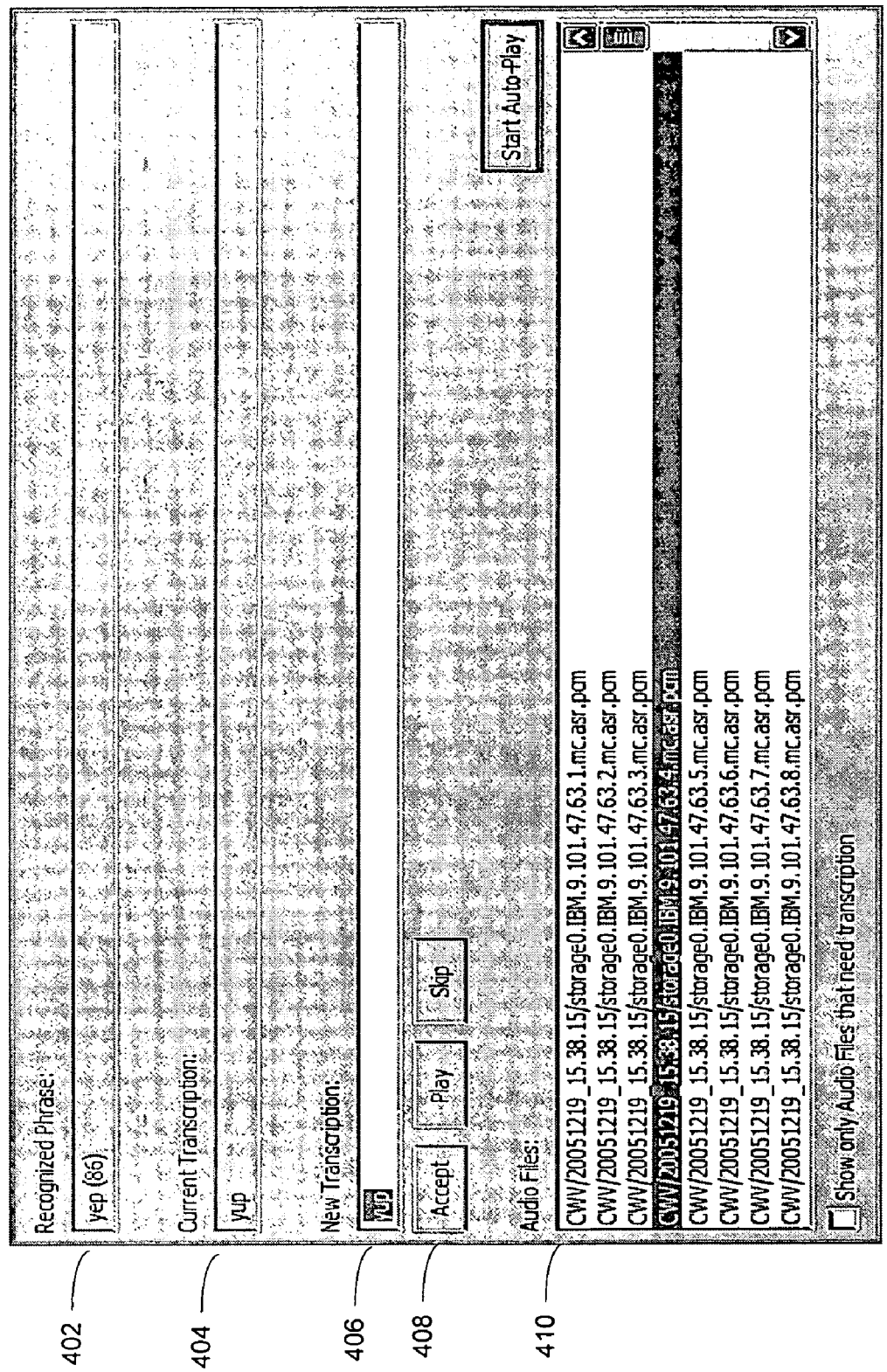
FIG. 4 is an exemplary graphical user interface of a visual toolkit for prioritizing a speech transcription, according to still another embodiment of the invention.

Referring to FIG. 4, another embodiment of the visual toolkit for prioritizing a speech transcription is shown. The visual toolkit can include a recognized phrase field 402 for presenting a text form of a recognized result, a current transcription field 404 which can default to the text form of the recognized result, a new transcription field 406 for updating the recognized result if the current transcription is incorrect, a button panel 408 for handling the visual toolkit and navigating through audio files in the audio file list 410. The button panel can include buttons for accept, play, skip, and auto-play. The audio file list 410 can include a list of spoken utterances to transcribe. For example, a user can play 408 an audio file of a spoken utterance in the audio list 410. The user can listen to the spoken utterance and determine if the text generated by the speech recognition system corresponds to a correct interpretation of the spoken utterance. If the text form of the recognized result 402 is correct, the user can accept the default text form of the recognized result 404, and proceed to listen to the next audio file. If the text form of the recognized result 402 is incorrect, the user can edit the text in the new transcription field 406. The user can accept the new text to correspond to the recognized result.

As described herein, with a method of prioritizing speech transcription for validating speech recognition performance according to one embodiment of the invention, information can be logged from a speech recognition system during a recognition of one or more spoken utterances. The information can be categorized and presented in a visual display, and a transcription category can be automatically filled with a text representation of the recognized result. Automatically filling the transcription with the recognized results saves time during validation. The categories can be prioritized for transcription based on an accuracy rating. The accuracy rating can be a weighting of the confidence score by the N-best matches. Accordingly, a visual display can be automatically prioritized for identifying spoken utterances having a transcription priority in view of a recognition result.

The method described herein has been provided for purposes of illustration only. As such, it should be appreciated that particular steps can be performed in varying order without departing from the spirit or essential attributes of the present invention.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for prioritizing speech recognition results from a plurality of speech recognition tasks to a human transcriptionist for evaluation, the method comprising acts of:
    accessing logged information generated during the plurality of speech recognition tasks, the accessing comprising accessing first logged information generated during a first speech recognition task and second logged information generated during a second speech recognition task, the first speech recognition task being performed on one or more first spoken utterances and producing a first recognized text, the second speech recognition task being performed on one or more second spoken utterances different from the one or more first spoken utterances and producing a second recognized text different from the first recognized text;
    associating a first accuracy rating with at least one portion of the first recognized text based at least in part on the first logged information, wherein the at least one portion of the first recognized text comprises a recognized phrase output by the first speech recognition task based on the one or more first spoken utterances, and wherein the first accuracy rating associated with the at least one portion of the first recognized text is based at least in part on at least one item of information that relates to the recognized phrase but is independent of a confidence score associated with the recognized phrase and independent of confidence scores associated with a plurality of phrases in an N-best match output by the first speech recognition task, the plurality of phrases in the N-best match being different from the recognized phrase;
    associating a second accuracy rating with at least one portion of the second recognized text based at least in part on the second logged information; and
    presenting the at least one portion of the first recognized text and the at least one portion of the second recognized text to the human transcriptionist for evaluation, wherein the at least one portion of the first recognized text is presented in such a manner as to be dissociated from at least one other portion of the first recognized text, and wherein at least one visual indication is provided to reflect a priority between the at least one portion of the first recognized text and the at least one portion of the second recognized text, the priority being determined based at least partially on the first and second accuracy ratings.

2. The method of claim 1, wherein the method further comprises:
    automatically presenting the recognized phrase to the human transcriptionist as modifiable text; and
    audibly rendering to the human transcriptionist at least one portion of the one or more first spoken utterances corresponding to the recognized phrase to allow the human transcriptionist to evaluate validity of the recognized phrase.

3. The method of claim 2, further comprising updating a speech recognition system used to perform the first speech recognition task based at least in part on the recognized phrase and a transcription of the corresponding at least one portion of the one or more first spoken utterances provided by the human transcriptionist.

4. The method of claim 1, wherein the first logged information comprises audio data representing at least a portion of the one or more first spoken utterances on which the first speech recognition task was performed.

5. The method of claim 4, wherein the first accuracy rating associated with the at least one portion of the first recognized text is a function of the confidence scores associated with the plurality of phrases in the N-best match.

6. The method of claim 5, further comprising:
    lowering the first accuracy rating when the confidence scores of the plurality of phrases in the N-best match approximate the confidence score associated with the recognized phrase.

7. The method of claim 4, wherein the at least one item of information is selected from a group consisting of:
    a phonetic analysis of the plurality of phrases in the N-best match;
    an acoustic confusability of at least one portion of the one or more first spoken utterances corresponding to the recognized phrase; and
    a correlation difference between the at least one portion of the one or more first spoken utterances corresponding to the recognized phrase and other spoken utterances whose corresponding recognized phrases coincide with the recognized phrase.

8. The method of claim 1, further comprising:
    providing an accuracy threshold;
    identifying a portion of a recognized text as being validated when a corresponding accuracy rating is above the accuracy threshold; and
    identifying a portion of a recognized text as being invalidated when a corresponding accuracy rating is below the accuracy threshold.

9. The method of claim 8, further comprising visually displaying portions of recognized texts, wherein validated portions and invalidated portions are visually distinguished using a color coding scheme.

10. The method of claim 1, further comprises acts of:
    logging the logged information during the plurality of speech recognition tasks.

11. The method of claim 1, wherein the one or more first spoken utterances are provided in a first audio file and the one or more second spoken utterances are provided in a second audio file different from the first audio file.

12. A system for prioritizing speech recognition results from a plurality of speech recognition tasks performed by a speech recognition system, the system comprising at least one processor programmed to:
    access captured information captured during the plurality of speech recognition tasks, comprising accessing first captured information captured during a first speech recognition task and second captured information captured during a second speech recognition task, the first speech recognition task being performed on one or more first spoken utterances and producing a first recognized text, the second speech recognition task being performed on one or more second spoken utterances and producing a second recognized text different from the first recognized text;
    associate a first accuracy rating with at least one portion of the first recognized text based at least in part on the first captured information, wherein the at least one portion of the first recognized text comprises a recognized phrase output by the first speech recognition task based on the one or more first spoken utterances, and wherein the first accuracy rating associated with the at least one portion of the first recognized text is based at least in part on at least one item of information that relates to the recognized phrase but is independent of a confidence score associated with the recognized phrase and independent of confidence scores associated with a plurality of phrases in an N-best match output by the first speech recognition task, the plurality of phrases being different from the recognized phrase;

associate a second accuracy rating with at least one portion of the second recognized text based at least in part on the second captured information; and display, on a display device, the at least one portion of the first recognized text and the at least one portion of the second recognized text, wherein the at least one portion of the first recognized text is presented in such a manner as to be dissociated from at least one other portion of the first recognized text and wherein at least one visual indication is provided to reflect a priority between the at least one portion of the first recognized text and the at least one portion of the second recognized text, the priority being determined based at least partially on the first and second accuracy ratings.

13. The system of claim 12, wherein the first captured information comprises audio data representing at least one portion of the one or more first spoken utterances on which the first speech recognition task was performed.

14. The system of claim 12, wherein the at least one processor is further programmed to:
categorize captured information into a plurality of categories comprising a spoken utterance category, a recognized phrase category, a confidence score category, and an N-best match category; and
display the captured information along with portions of recognized texts, wherein the captured information is arranged according to the plurality of categories.

15. The system of claim 14, wherein the at least one processor is further programmed to perform:
displaying a play button in association with the at least one portion of the first recognized text and, when a user activates the play button, audibly rendering at least one portion of the one or more first spoken utterances corresponding to the at least one portion of the first recognized text;
displaying, in a text entry, the recognized phrase output by the first speech recognition task;
displaying the confidence score associated with the recognized phrase; and
displaying, in a pop-up box, the N-best match comprising the plurality of phrases different from the recognized phrase.

16. The system of claim 12, wherein the at least one processor is further programmed to:
display a modifiable text box and automatically fill the modifiable text box with the recognized phrase; and
audibly render to the human transcriptionist at least one portion of the one or more first spoken utterances corresponding to the recognized phrase to allow the human transcriptionist to evaluate validity of the recognized phrase.

17. The system of claim 12, wherein the at least one processor is further programmed to display portions of recognized texts according to a color coding scheme that visually distinguishes at least some of the portions of recognized texts having different priorities.

18. The system of claim 12, wherein the at least one processor is further programmed to:
capture the captured information during the plurality of speech recognition tasks.

19. The system of claim 12, wherein the one or more first spoken utterances are provided in a first audio file and the one or more second spoken utterances are provided in a second audio file different from the first audio file.

20. A method for presenting to a human transcriptionist for evaluation at least one portion of a first recognized text and at least one portion of a second recognized text produced by, respectively, first and second speech recognition tasks performed by a speech recognition system, the method comprising acts of:
importing first log information generated during the first speech recognition task, the first log information comprising first audio data comprising one or more first spoken utterances on which the first speech recognition task was performed, a first recognized text output by the first speech recognition task, the first recognized text comprising a first recognized phrase, a first confidence score associated with the first recognized phrase, and a first N-best match comprising a first plurality of phrases different from the first recognized phrase and a confidence score associated with each phrase of the first plurality of phrases;
importing second log information generated during the second speech recognition task, the second log information comprising second audio data comprising one or more second spoken utterances on which the second speech recognition task was performed, a second recognized text output by the second speech recognition task, the second recognized text being different from the first recognized text and comprising a second recognized phrase, a second confidence score associated with the second recognized phrase, and a second N-best match comprising a second plurality of phrases different from the second recognized phrase and a confidence score associated with each phrase of the second plurality of phrases, the second audio data being different from the first audio data;
determining, automatically and based at least in part on the first and second logged information, which one of the first and second recognized phrases is to be evaluated by a human transcriptionist before the other one of the first and second recognized phrases, wherein the act of determining is further based on at least one item of information that is independent of the first and second confidence scores and the confidence scores associated with the first and second pluralities of phrases;
displaying a modifiable text box and automatically filling the modifiable text box with the first recognized phrase; and
playing back to the human transcriptionist at least one portion of the first audio data comprising the one or more first spoken utterances on which the first speech recognition task was performed to output the first recognized phrase, to allow the human transcriptionist to evaluate validity of the first recognized phrase.

21. The method of claim 20, further comprising:
associating a first accuracy rating with the first recognized phrase, based at least in part on the confidence scores associated with the first plurality of phrases in the first N-best match; and
associating a second accuracy rating with the second recognized phrase, based at least in part on the confidence scores associated with the second plurality of phrases in the second N-best match, wherein the act of determining comprises determining which one of the first and second accuracy ratings is lower than the other one of the first and second accuracy ratings, and wherein the first accuracy rating is further based on the at least one item of information that is independent of the first and second confidence scores and the confidence scores associated with the first and second pluralities of phrases.

22. The method of claim 21, wherein the first accuracy rating is determined based at least in part on a plurality of distance measures corresponding respectively to the first plurality of phrases in the first N-best match, each distance measure representing a difference between the first confidence score associated with the first recognized phrase and the confidence score associated with a corresponding one of the first plurality of phrases in the first N-best match.

23. The method of claim 21, wherein the at least one item of information is selected from a group consisting of:
   a phonetic analysis of the first plurality of phrases in the first N-best match;
   an acoustic confusability of the at least one portion of the one or more first spoken utterances corresponding to the first recognized phrase; and
   a correlation difference between the at least one portion of the one or more first spoken utterances corresponding to the first recognized phrase and other spoken utterances whose corresponding recognized phrases coincide with the first recognized phrase.

24. The method of claim 20, wherein the one or more first spoken utterances are provided in a first audio file and the one or more second spoken utterances are provided in a second audio file different from the first audio file.

25. A system for displaying speech recognition results from a plurality of speech recognition operations, the system comprising at least one processor programmed to display on a display device:
   a recognized phrase field for presenting a text form of a recognized result output by a speech recognition operation performed on an audio recording of at least one spoken utterance;
   a current transcription field that defaults to the text form of the recognized result;
   a new transcription field for editing a current transcription when a human transcriptionist determines that the current transcription is incorrect; and
   a panel for navigating through audio files in an audio file list, the audio file list comprising an audio file comprising the audio recording of the at least one spoken utterance on which the speech recognition operation was performed to output the recognized result, wherein:
      the recognition result output by the speech recognition operation comprises a recognized phrase, a confidence score associated with the recognized phrase, and an N-best match comprising a plurality of phrases different from the recognized phrase and a confidence score associated with each phrase of the plurality of phrases; and
      the at least one processor is further programmed to select the speech recognition operation from the plurality of speech recognition operations based at least in part on an accuracy rating associated with the recognition result output by the speech recognition operation, the accuracy rating being based at least in part on at least one item of information that relates to the recognized phrase and is independent of the confidence score associated with the recognized phrase and independent of the confidence scores associated with the plurality of phrases in the N-best match.

26. The system of claim 25, wherein the at least one item of information comprises a phonetic analysis of the plurality of phrases in the N-best match.

27. The system of claim 25, wherein the at least one item of information comprises an acoustic confusability of at least one portion of the at least one spoken utterance corresponding to the recognized phrase.

28. The system of claim 25, wherein the at least one item of information comprises a correlation difference between at least one portion of the at least one spoken utterance corresponding to the recognized phrase and other spoken utterances whose corresponding recognized phrases coincide with the recognized phrase.

* * * * *